INVENTOR.
Jaroslav Toifl
BY Richard Low
Agt

INVENTOR.
Jaroslav Toifl
BY
Richard Low
Ag't

INVENTOR.
Jaroslav Toifl
BY
[signature]
Ag't

INVENTOR.
Jaroslav Toifl
BY
Richard Low
Ag't

INVENTOR.
Jaroslav Toifl
BY
Richard Low
Ag't

INVENTOR.
Jaroslav Toifl
BY
Richard Ernst
Ag't

United States Patent Office 3,430,118

Patented Feb. 25, 1969

3,430,118

APPARATUS INCLUDING FERROTRANSISTOR SWITCHES FOR MINIMIZING DEAD ZONES IN A SERVOMECHANISM

Jaroslav Toifl, Prague, Czechoslovakia, assignor to Vyzkumny ustav matematickych stroju, Prague, Czechoslovakia Filed Oct. 20, 1965, Ser. No. 498,858

U.S. Cl. 318—18 7 Claims

Int. Cl. G05b *11/01;* H02p *7/74, 5/46*

ABSTRACT OF THE DISCLOSURE

Two counters each capable of containing a count of $n$ operate in synchronism and at the same frequency. Movement of an output element of a digital servomechanism results from a difference in the contents of one of the counters with respect to the other in response to the application of command pulses to the servomechanism. Apparatus for minimizing dead zones in the servomechanism comprises a coincidence circuit connected to selected outputs of the counters. The output of the coincidence circuit is applied as input to first and second gate circuits. A first two-position switch interposed between one of the counters and the set input of a flip-flop normally connects the $n$th count output of the one of the counters to the set input when the first switch is in a first selected position. A second two-position switch interposed between the other of the counters and the reset input of the flip-flop normally connects the $n/2$th count output of the other of the counters to the reset input when the second switch is in a first selected position. The output of the coincidence circuit is applied via the gate circuits to both switches to change the switches to a second selected position. In its second position, the first switch connects the $n$-$m$ mount output of the one of the counters as a set input to the flip-flop, and in its second position, the second switch connects the $$\frac{n}{2}-m$$

count output of the other of the counters as a reset input to the flip-flop. The flip-flop produces at its output an output square wave in which the duration of the complementary portions of a cycle of the square wave vary in accordance with the outputs of the counters. The $m$ quantity caused a corresponding variation in duration and is selected to represent a specific duration increment.

This invention relates to servo devices. More particularly, it relates to apparatus for compensating for dead zone effects which occur in the operation of servomechanisms.

Dead zones in servomechanisms essentially result from passive moments which produce friction at the servomechanism shaft, although backlash in gears may cause dead zones. Dead zones due to backlash, however, are sufficiently minimal so that they may be disregarded. Due to friction produced by passive moments, the shaft does not rotate until an applied torque attains a specific minimum value which is greater than zero.

Accordingly, it is an important object of this invention to provide apparatus for compensating for dead zones in digital type servomechanisms, that is, for reducing the dead zone to a chosen small value without changing the gain in the servo loop.

Generally speaking and in accordance with the invention, a comparator is provided in a digital servomechanism for controlling the movements of an output element in opposite directions, such movement being effected in response to command pulses and to pulses in a feedback loop. The comparator comprises a pair of counters, each capable of containing a count $n$ therein. The counters operate as cycle in synchronism at the same frequency and in phase, a difference in the contents of one of the counters with respect to the contents of the other of the counters in response to the application of the pulses to the servomechanism causing the movement. Means are provided for minimizing dead zones in the servomechanism. Such means comprises a coincidence circuit which is operated in response to the application thereto of the outputs of the counters. The dead zone minimizing means further include first and second gate circuits, the outputs of each of the gate circuits respectively being applied as inputs to the other of the gate circuits. The output of the coincidence circuit is applied as inputs to both of the gate circuits. A flip-flop is included, as are a first two-position signal switch, for normally connecting the $n$th count output of one of the counters as a set input to the flip-flop while it is in one of its positions, and a second two-position switch, for normally connecting the $(n/2)$th count output of the other of the counters when the second two-position switch is in one of its positions. Means are included for applying the output of the coincidence circuit to both of the switches to change the switches to their other positions. The other position of the first switch connects the $(n—m)$ count output of the one counter as a set input to the flip-flop and the other position of the second switch connects the $$\frac{n}{2}-m$$

count output of the other counter as a reset input to the flip-flop. The flip-flop produces an output square wave in which two widths or durations of the complimentary portions of a cycle of the square wave vary in accordance with the outputs of the counters, the $m$ quantity causing a variation in the widths or durations commensurate therewith and being selected to represent a given duration or width increment.

For a better understanding of the invention together with other and further objects thereof, reference is had to the following description taken in conjunction with the accompanying drawings, wherein.

Figure 3:
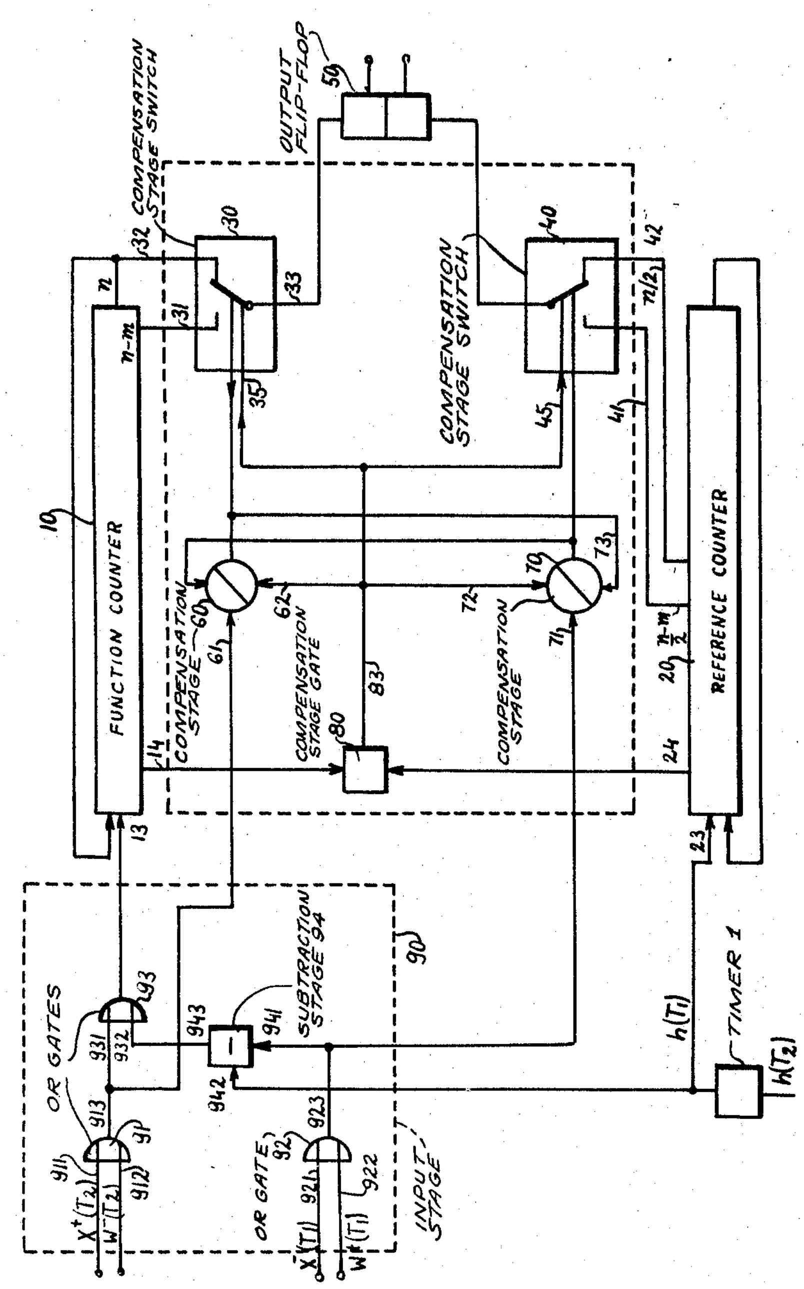
FIG. 3 is a block diagram of an illustrative embodiment of apparatus of the present invention for compensating for dead zone in servomechanism.
Figure 8:
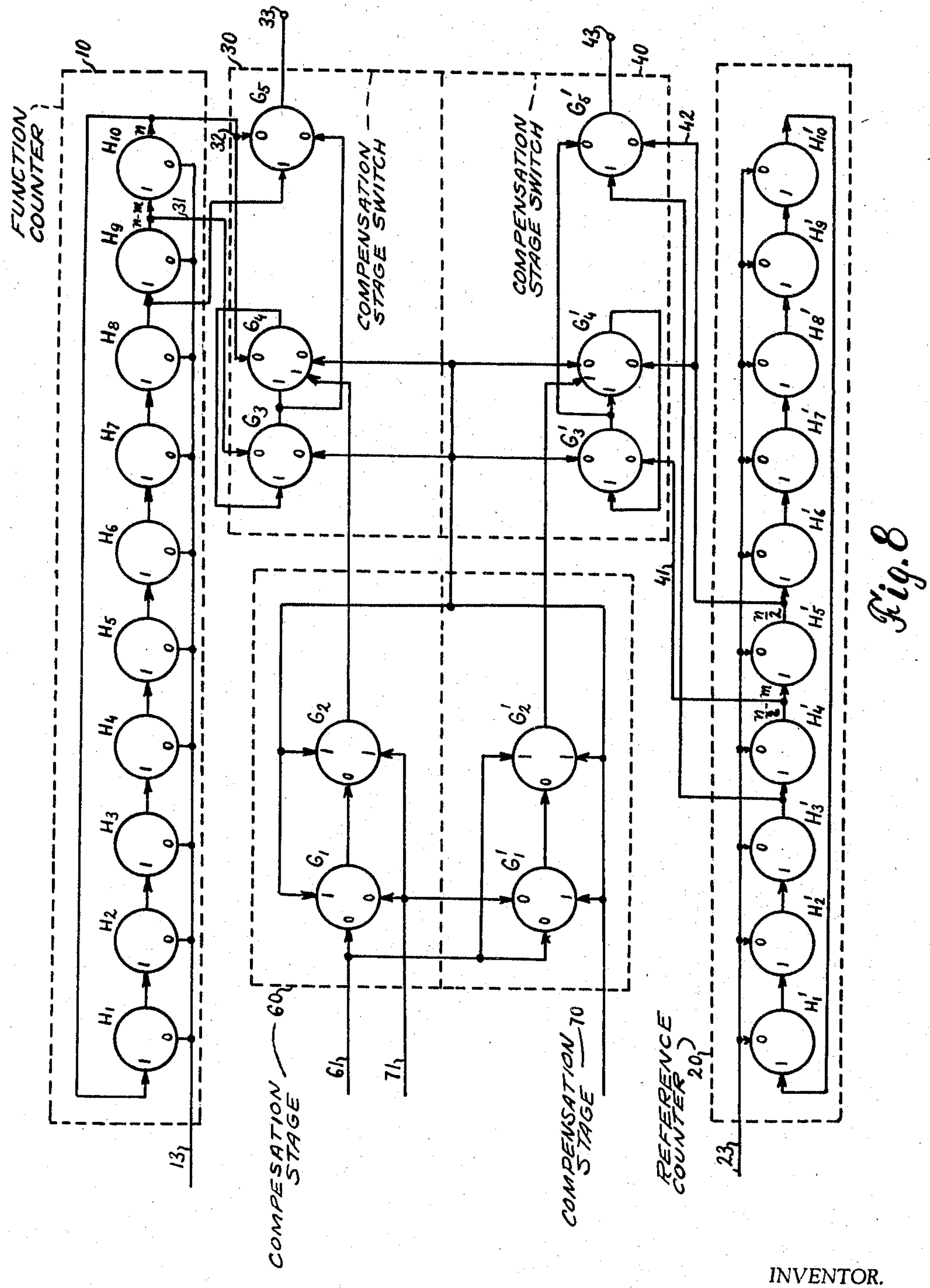
Figure 9:
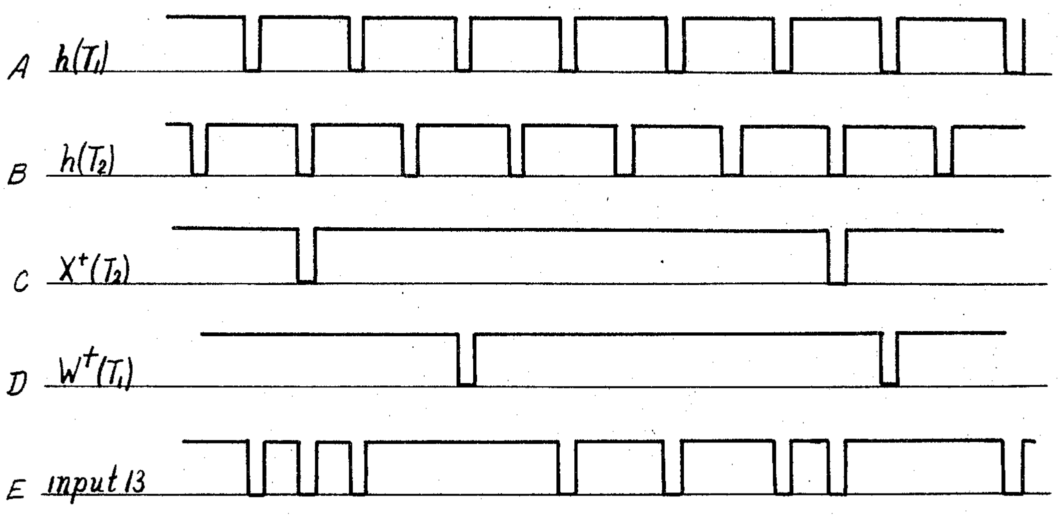
Figure 10A:
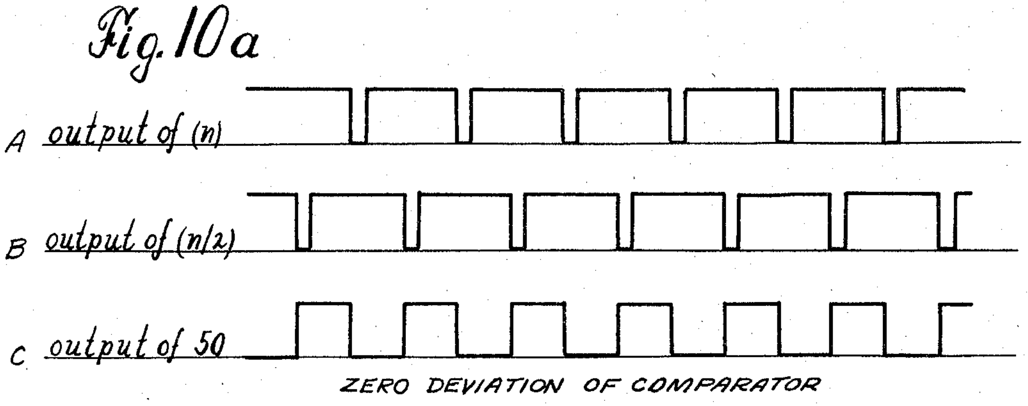

FIG. 8 is a block diagram of the gates 60 and 70, the switches 30 and 40, and the counters 10 and 20 of FIG. 3;

FIG. 9 is a timing diagram of the $h$(T1), the $h$(T2), the $X^+$ (T2), the $W^+$ (T1) and the input signal in the lead 13 of the function counter 10 of FIG. 3; and FIG. 10*a, b,* and *c* are timing diagrams of the output signals of the flip-flop circuit 50 in accordance with the shifting of condition of the function counter 10 and the reference counter 20 of FIG. 3.

Figure 1:
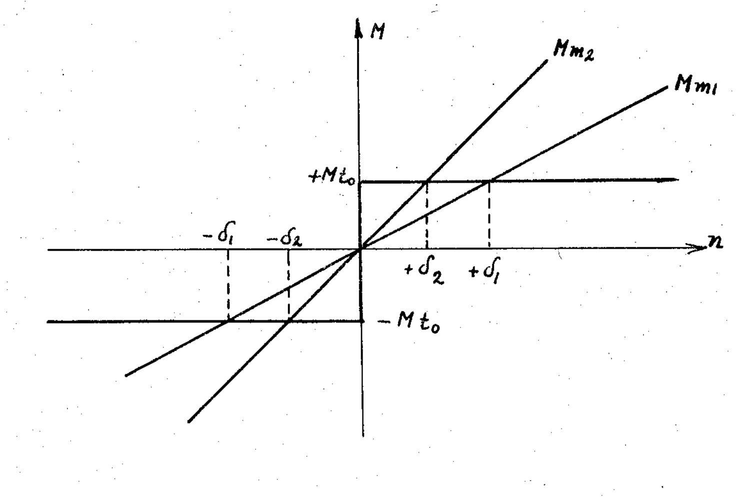
FIG. 1 is a graph showing the relationship of dead zone in servomechanisms to gain in the servo loop in known servomechanisms.

FIG. 1 shows two types of possible dead zone phenomena. The dead zones are respectively defined by the closed intervals $<-\delta_1, +\delta_1>$ and $<-\delta_2, +\delta_2>$ for a constant moment of friction $M_{to}$. The respective limits of the dead zones are determined by the intersections $M_m=f(n)$ and the friction characteristic. The moment of friction is defined by the expression $M_t-M_{to}$ with $M_{to}$ having the sign of $n$, the value $n$ representing the contents of a digital comparator in the servomechanism. Since the contents of the comparator are digital, these contents assume $n$ discrete values between zero and the maximum numerical capacity of the comparator, either negative or positive. The function $M_m=f(n)$ expresses the open loop gain of the servomechanism.

It is readily apparent upon the examination of FIG. 1 that the magnitude of a dead zone can be influenced by the magnitude of the gain of the servomechanism as seen by the different magnitude dead zones resulting from $M_{m1}$ and $M_{m2}$. Such phenomena create the disadvantages that an increase in gain may tend to adversely affect the stability of the servomechanism and to increase the necessary operational requirement of the amplifier therein. In this latter connection, the requirements for the amplifier particularly have to be increased relative to its stability and linearity. Further, there is a likelihood of further non-linearity due to the possible saturation of the amplifier. In known servomechanisms, it has been necessary to decrease the aforedescribed dead zones by improving the characteristics of the amplifier of the servomechanism regardless of the difficulties presented thereby.

Figure 2:
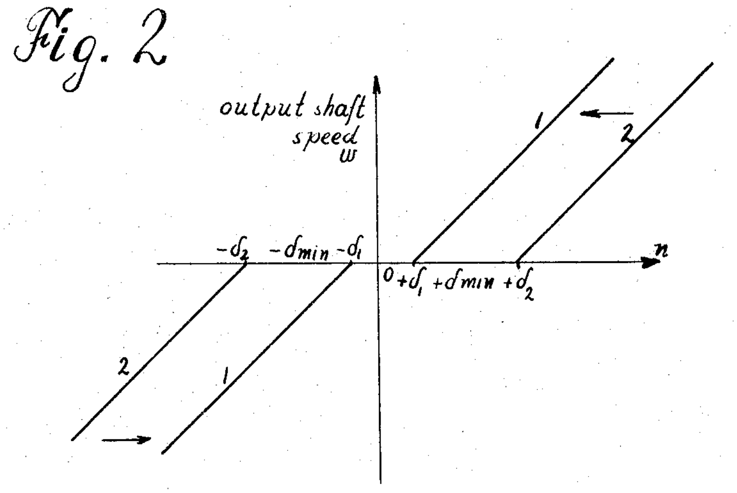
FIG. 2 is a graph showing the compensation for dead zone in the loop of a servomechanism while keeping the gain in the loop constant.

FIG. 2 shows a graph having two characteristics, 1 and 2. Characteristic 2 is that of the rotational velocity $\omega$ as a function of the contents $m$ of the digital comparator, for the separate feedback coupling of the servomechanism, and has a dead zone $<-\delta_2, +\delta_2>$ when no compensation is provided. With compensation, the rotational velocity characteristic 2 is changed to the characteristic 1 which has a dead zone defined by the interval $<-\delta_1, +\delta_1>$ which is smaller than the selected minimal dead zone interval $<-\delta_{min}+\delta_{min}>$. In FIG. 2, the abscissa represents the comparator contents $n$ and the ordinate represents the rotational velocity $\omega$ and both characteristics 1 and 2 are parallel, which indicates that the gain in the servomechanism loop is the same with both characteristics.

The circuit of FIG. 3 compensates for the dead zone in accordance with the principles of the invention. In FIG. 3, the comparator stage of the digital servomechanism comprises a function counter 10, a reference counter 20, an input stage 90, enclosed in a broken line box, compensation stages 30, 40, 60, 70 and 80 which compensate for the dead zone, an output flip-flop stage 50, and a timer 1.

In FIG. 3, the timer 1, which suitably may be a pulse generator produces two clock pulse train outputs $h$(T1) and $h$(T2) of the same frequency, 180° displaced in phase with respect to each.

The feedback loop of a servo device used in connection with this invention is described in more detail in pending United States Patent Application Ser. No. 491,-204, for "Digital Comparator" of Jaroslav Toifl et al. In such pending application the comparator without compensation for the dead zone effect is described. In the pending application, the generation of the X and W pulses are also shown. The X pulses ($X^+$, $X^-$) are transmitted from the command or control means and the W pulses ($W^+$, $W^-$) are transmitted from the decoder of the feedback means, as shown in FIG. 1 of said pending application. The command pulses from a command stage (not shown) for effecting movement of the output element of the servomechanism bear the designation X and the feedback pulses for effecting movement of the output element of the servomechanism bear the designation W. A command pulse $X^+$ for effecting a positive incremental movement of the output element has the phase of the pulses T2, a command pulse $X^-$ for effecting a negative movement of the output element has the phase of the pulses T1, a feedback pulse $W^+$ for effecting a negative movement of the output element in response to its positive movement has the phase of the pulses T1, and a feedback pulse $W^-$ for effecting a positive movement of the output element in response to its negative movement has the phase of the pulses T2. The command pulses $X^+$ (T2) and $X^-$ (T1) are applied as inputs 911 and 921 to OR gates 91 and 92, respectively, of the input stage 90. The feedback pulses $W^-$ (T2) and $W^+$ (T1) are applied as inputs 912 and 922 to the OR gates 91 and 92, respectively. When the circuit is in a null condition, the contents of the function counter 10 and the reference counter 20 are equal in value. The $h$(T1) output pulse train from the timer 1 is directly applied as an input 23 to reference counter 20 and an input 13 to function counter 10 through the subtraction stage 94, the input 942 and the output 943 of said subtraction stage and OR 93 and the input 932 thereof. The output 913 of OR gate 91 is also applied as an input 931 to OR gate 93. Output 923 of OR gate 92 is applied as input 941 to subtraction stage 94.

If a step in the positive direction of the X axis is programmed in the command stage, the $X^+$(T2) pulses generated pass through OR gates 91 and 93 into function counter 10. These pulses are intermixed in the $h$(T1) pulse train output from the subtraction stage 94 by the action of OR gate 93, that is, they are added to the $h$(T1) pulse train, whereby function counter 10 will be tripped by the output of gate 93 in an amount exceeding the number of $h$(T1) pulses tripping reference counter 20 equal to the number of $X^+$(T2) pulses. Consequently, the servomechanism moves the output element in a positive direction. If a step in the negative direction is programmed in the command stage, $X^-$(T1) pulses generated enter into subtraction stage 94 through OR gate 92 and are in phase with the $h$(T1) pulses from timer 1 applied to said subtraction stage. In subtraction stage 94, the number of $X^-$(T1) pulses are removed from the $h$(T1) pulse train, so that function counter 10 is not tripped by the number of subtracted pulses. The reference counter 20, however, is continually tripped by the $h$(T1) pulse train, whereby, the count in counter 10 lags the count in counter 20 and the output element is moved in a negative direction. Thus, subtraction stage 94 may suitably comprise an inverter for inverting the output of gate 92 and a junction of input 942 and the output of the inverter. A feedback pulse $W^-$(T2) has the same effect as a command pulse $X^+$(T2) and a feedback pulse $W^+$(T1) has the same effect as a command pulse $X^-$(T1).

If the servomechanism is at rest and no command signals are applied to the input, both counters 10 and 20 count synchronously. When command signals are applied, as hereinbefore explained, there is no longer correspondence of the counts in the counters and the contents of function counter 10 are caused to differ from the contents of reference counter 20 by number $n$ depending upon the programmed command. The difference in contents of the counters 10 and 20 is utilized to shift the position of the servomechanism and a signal derived from the difference of the contents of the counters, after being amplified, is applied to a servomotor to effect movement in the servomechanism. The degree of this movement is sensed by a suitable sensor or transducer (not shown). When, for example, only one command pulse had been applied to effect servomotor movement, one feedback pulse will be generated to halt the movement of said motor. If, however, a variation in velocity is programmed into the command stage, the comparator will be partly filled and the magnitude of the error signal will correspond to the phase difference between counters 10 and 20. The output element of the servomechanism is caused to move with a velocity corresponding to the deviation which is stored in the comparator. The sensor generates a pulse train having a frequency which is proportional to the velocity of movement of the servomechanism output element and the signal $W^+$(T1) or $W^-$(T2) is fed to the appropriate inputs of the comparator of the servomechanism, the latter signal decreasing the deviation caused by the command signal $X^+(T2)$ or $X^-(T1)$. The magnitude of the deviation, that is, the effective phase difference between the contents of counters 10 and 20, is represented in the output of flip-flop 50. The outputs of the function counter 10 and the reference counter 20 are applied as set and reset inputs, respectively, to flip-flop 50.

The set input of flip-flop 50 is connected through switch 30, when said switch is in its normal position, as shown in FIG. 3, to the output of function counter 10 upon the occurrence of the *n*th bit in said function counter. The set input of flip-flop 50 is connected through switch 40, when said switch is in its normal position, as shown in FIG. 3, to the output of the reference counter 20 upon the occurrence in said $n/2$th bit of reference counter. If both switches are in their normal positions, as shown in FIG. 3, and there is no deviation in the system, that is, the contents of counters 10 and 12 are equal to each other, then the output of flip-flop 50 has a symmetrical square wave-form. The complementary half cycles of each cycle of the output of the flip-flop 50 are of equal width, such equal width being conveniently expressed as a 1:1 ratio between the half cycles. If there is either a positive or negative deviation from the equal condition between the contents of counters 10 and 20, the ratio of the half cycle width in the output of flip-flop 50 differs from 1:1 and may be $a$:1 or 1:$a$ wherein $a$ is a number greater than 1.

The foregoing description of the operation of the digital comparator does not include the description and operation of the stages which function to provide compensation for the dead zone.

The stages which provide dead zone compensation in accordance with the principles of the invention are switches 30 and 40, gate circuits 60 and 70 and coincidence circuit 80. These circuits increase the amplitude of the first pulse, whether command or feedback, which places the comparator into a state or condition different from the zero or non-deviation state. Such an increase in amplitude insures that the moving part of the servomechanism commences movement.

In the operation of the dead zone compensation stages, it may first be assumed that the contents of counters 10 and 20 are equal, so that the deviation in the comparator is zero and consequently the outputs 14 and 24 of counters 10 and 20, respectively, are in synchronism through all of the $n$ states of said counters. Outputs 14 and 24 are applied to a coincidence or AND stage 80, and output being produced by said stage upon the coincidence of both inputs thereto. The output 83 of stage 80 is applied as inputs 62 and 72 to gate stages 60 and 70, respectively, and is also applied as inputs 35 and 45 to switches 30 and 40 to return them to their normal positions in the event that they are not in such positions. Gate stages 60 and 70 are operated or switched to this conductive condition upon the application of inputs 62 and 72, respectively, thereto. In this zero deviation state of the comparator, the complementary half cycle outputs of flip-flop 50 have a duration or width ratio of 1:1.

It may then be assumed that a command pulse $X^+(T2)$ is applied to OR gate 91. This pulse is intermixed with the $h(T1)$ pulse train, hereinbefore as explained, whereby function counter 10 is shifted forward one increment as compared to counter 20. Simultaneously, the $X^+(T2)$ pulse is applied from output 913 of gate 91 as an input 61 to gate 60. Since gate 60 has been switched to its conductive condition by the output from stage 80, the $X^+(T2)$ pulse appears at the output of gate 60 and switches the switch 30 in position the position opposite that shown in FIG. 3. The function counter 10 is thereby connected to flip-flop 50 through its output 31 and through switch 30. Simultaneously, the input 73 to gate 70 is blocked by the output of gate 60. Subsequently occurring $X^+(T2)$ pulses have no further effect, that is, the position of the switch 30 remains changed and gate 70 remains in its non-conductive condition. A feedback signal at this time has no influence on the positions of switches 30 or 40 and on the conductive conditions of gates 60 and 70. The shifting of switch 30 from its connection to input 32 to its connection to input 31 is followed by a sudden step change of the switch for the output signal from the flip-flop. Such sudden change is proportional to the number $m$ which is the number of bits remaining to attain the value $n$ at the time of the sudden change that is $(n-m)$ is the count in the counter at the last-mentioned instant of time.

The number $m$ is preferably experimentally so selected that the output element of the servomechanism commences movement with the occurrence of the first command pulse, preferably with the feedback loop uncoupled. The switch 30 remains in its changed position during the entire period necessary for compensating for the deviation in the comparator. However, as soon as the number of feedback pulses $W^+(T1)$ becomes equal to the number of command pulses $X^+(T2)$, such deviation is balanced out and counters 10 and 20 operated or count again in synchronism. Thereupon, the condition for operating coincidence circuit 80 is again met thereby and the signal appears at the output of stages which again switches the gates 60 and 70 to their conductive condition and returns switches 30 and 40, as required, to their normal positions. Consequently, the half cycle output width or duration ration of flip-flop 50 becomes 1:1 again and the servomechanism becomes quiescent.

An analogous sequence of events occurs upon the receipt of a first command signal $X^-(T1)$. The latter signal passes through gate 70 and switches the gate 60 to its non-conductive condition to again cause a sudden change in the ratio of the output signal of flip-flop 50, but in a direction opposite from the preceding described situation. The subsequent balancing of the deviation in the comparator causes the return of all of the compensation stages to the zero deviation state, which is, of course, accomplished by the output from coincidence circuit stage 80.

The circuit of FIG. 3 will comprise ferrotransistor circuits. A ferrotransistor is a bistable destructive reading unit and is a brief form of the words ferrite core transistor unit. Ferrotransistors are described in an article entitled "Magnetic Core Logic" by Robert Kodis, in "Instruments and Control Systems", vol. 34, No. 7, July 1961, pp. 1246 to 1249. The ferrite core has a rectangular hysteresis loop and a plurality of windings thereon. A transistor is connected to a winding of the ferrite core via the base electrode thereof and functions as the output of the ferrotransistor. The winding of the core transmits a pulse when said core is triggered by an interrogating signal. The transistor amplifies the pulse and the amplified pulse is provided at the emitter electrode of said transistor. The amplified pulse is the output pulse of the ferrotransistor..

Figure 4:
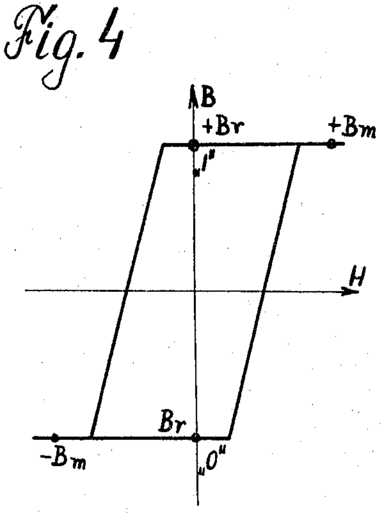
FIG. 4 is a graph showing the B–H loop of the magnetic core of a ferrotransistor.

FIG. 4 is a graphical presentation of the B–H loop of the magnetic core of a ferrotransistor.

Figure 5:
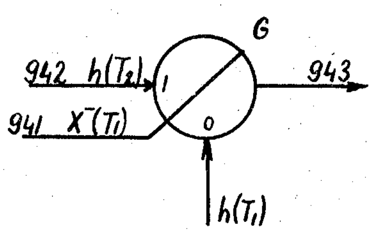
FIG. 5 is a schematic diagram of the subtraction stage 94 of FIG. 3.
Figure 6:
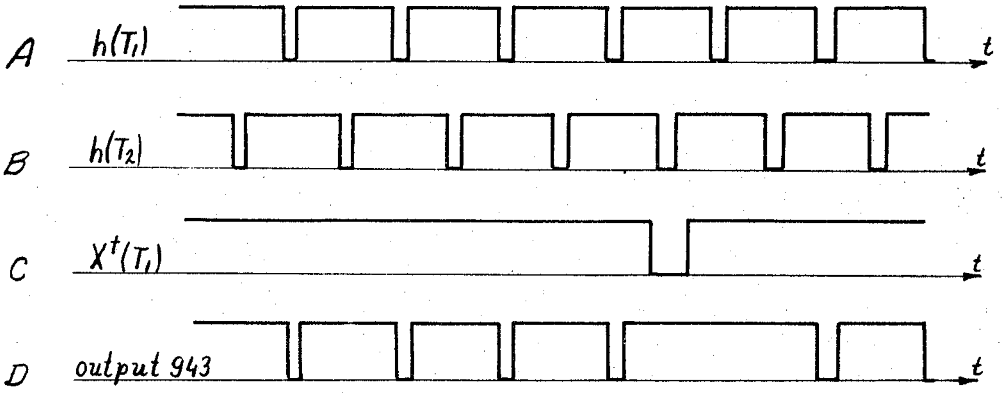
FIG. 6 is a timing diagram of input and output pulse sequences of the subtraction stage 94 of FIG. 3.

FIG. 5 is a diagram of subtraction stage 94 of FIG. 3 and comprises a ferrotransistor, shown symbolically in FIG. 5. If no pulse is present on the line 941 (FIG.5), the magnetic core is alternately remagnetized from its condition $+Br$ to its condition $-Br$ (FIG. 4). When the signal in the core is read out, a pulse appears at the output 943 in the time period T1 (FIG. 5). If an inhibition signal is then present in the input 941 (FIG. 4) the storing of the signal "1" in the core is stopped and one pulse is substracted from the output pulse sequence. FIG. 6 is a timing diagram of input and output pulse sequences of the subtraction stage 94. In FIG. 6, curves A, B, C and D are pulse trains $h(T1)$, $h(T2)$, $X^+(T1)$ and the output of the subtraction stage, respectively.

Figure 7:
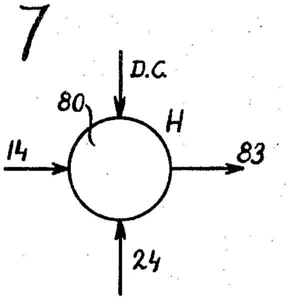
FIG. 7 is a schematic diagram of the coincidence stage 80 of FIG. 3.

FIG. 7 is a diagram of coincidence stage 80 and comprises a ferrotransistor, shown symbolically in FIG. 7.

A direct current is applied to the winding DC of ferrotransistor 80 and has an amplitude which permanently biases the magnetic core magnetically in the condition +Bm (FIG. 4). The arrival of one pulse on the line 14 or 24 (FIG. 7) causes the displacement of the working point of the magnetic core to the condition +Br (FIG. 4) and remagnetization to the opposite condition will not occur. The core is remagnetized only when both input pulses in the lines 14 and 24 coincide. The core is then remagnetized to the condition $-Bm$ (FIG. 4) and an output pulse is then provided at the output 83 (FIG. 7).

FIG. 8 is the ferrotransistor circuit of FIG. 3 and includes the gates 60 and 70, the switches 30 and 40 and the counters 10 and 20.

The operation of the circuit of FIG. 8 is explained for the example wherein $n=10$ and $m=1$ and the pulse trains are those shown in FIG. 10. The function counter 10 has ten ferrotransistors H1 to H10 and the reference counter 20 has ten ferrotransistors H'1 to H'10. If the circuit was manually reset to zero, at the beginning of the function the cores G3, G4 and G5 of the switch 30 are in their condition "0" and the cores G1 and G2 of the gate 60 are in their condition "1". After the arrival of the first pulse, for example, the sequence $X^+(T2)$ at the input 61, such pulse being of the $h$ type, the gates G1 and $G^-$1 of the compensation stages 60 and 70 are reset to zero. The output pulse of gate G1 of the stage 60 resets the gate G2 to the zero condtion. The output pulse of the gate G2 records the "1" in the gate G4 of the switch 30. The gate G'2 of the stage 70 will not be reset to zero, because the pulse $X^+(T2)$ prevents it. It follows that after the arrival of the first pulse of the sequence $X^+(T2)$, the gates G1 and G2 of the stage 60 and the gate G'1 of the stage 70 are in their "0" condition, so that none of the following pulses in the lines 61 and 71 can reach the switches 30 or 40. The gates 60 and 70 are in their non-conductive condition. At such time, the output marked ($n$) of the gate H10 of the function counter 10 resets the core of the gate G4 of the switch 30 to zero and the output $n-m$ of the gate H9 of said counter resets the core of the gate G3 of said switch to zero. The core of the gate G5 is thus reset to zero at the time that there is an output pulse from the gate G3. The input of the flip-flop circuit 50 (FIG. 3) is thus connected from the input 32, which is the output $n$ of the counter 10, to the output 31, which is the output $n-m$ of the counter 10, through the switch 30. The flip-flop circuit 50 is reset by the output $n/2$ to the output $$\frac{n}{2}-m$$

of the reference counter 20. As soon as a pulse is in the line 83 it causes both counters to operate in the same phase and thereby reset the circuit to zero. The pulse on the line 83 reverses the condition of the gates G1 and G2 of the stage 60 to the condtion "1" and the condition of the gates G3 and G4 of the switch 30 to the condition "0". The flip-flop circuit 50 is thereby reset by the outputs $n$ and $n/2$ of the counters 10 and 20. If the first pulse such as, for example, that of the pulse sequence $X^-(T1)$ arrives, the circuit operates in the aforedescribed manner and the switch 40 will be reversed in position and will connect the output $n/2$ to the output $$\frac{n}{2}-m$$

of the reference counter 20.

In a comparator without compensation for the dead zones of servomechanisms, the inputs of flip-flop circuit 50 are permanently connected to the output $n$ of function counter 10 and the $n/2$ of reference counter 20. This provides at the zero deviation signal complementary half cycle outputs of the flip-flop circuit 50 with a duration or width ratio of 1:1. When the circuit of the present invention for compensating for the dead zones of servomechanisms is utilized, it is necessary to change the ratio rapidly by switch because it is necessary to connect one input by switch to the output $n$ or the output $n-m$ of the function counter 10. In starting the servomechanism in the opposite direction it is necessary to change the ratio rapidly by switch, the ratio being that of the output signal of the flip-flop circuit 50 from the output $n/2$ to the output $$\frac{n}{2}-m$$

of the reference counter 20. The flip-flop circiut circuit 50 is connected like an Eccles-Jordan trigger circuit (not shown in the figures).

The feedback signal $W^+(T1)$ corresponds to the input signal $X^+(T2)$. FIG. 9 illustrates the timing diagrams of the signals $h(T1)$, $h(T2)$, $X^+(T2)$, and the signal on the input 13 of the counter 10 in curves A, B, C, D and E. The input signals $X^-(T1)$ and $W^-(T2)$ have the same pulse trains as curves C and D of FIG. 9.

Figure 10B:
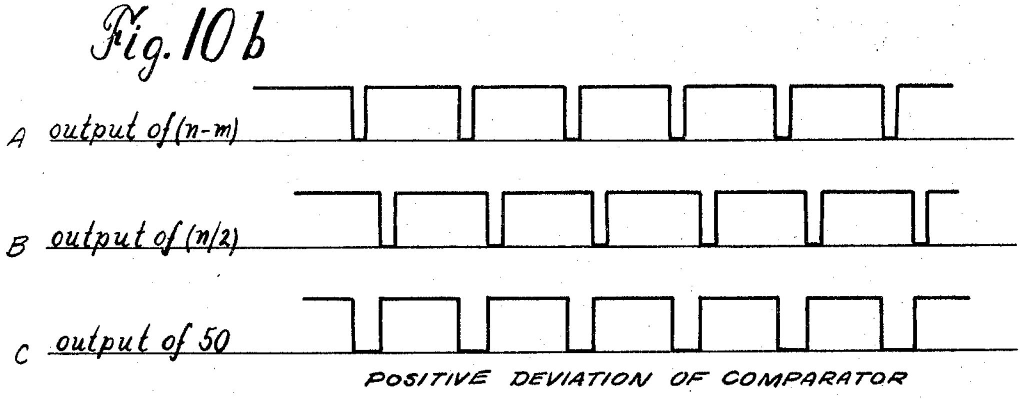
Figure 10C:
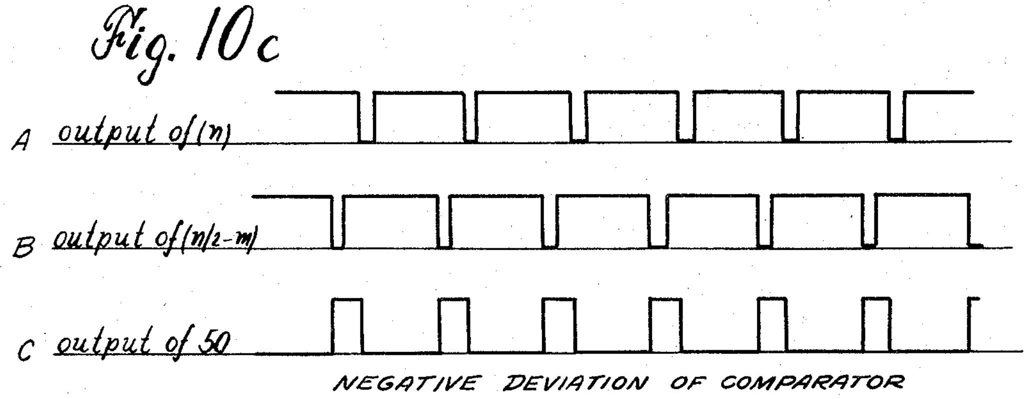

FIGS. 10*a*, 10*b* and 10*c* are timing diagrams of the $n$ output of the function counter 10 and the $n/2$ output of the reference counter 20. The timing diagrams of FIG. 10*a* represent the case in which the deviation of the comparator is zero. The timing diagrams of FIG. 10*b* represent the case in which the deviation of the comparator is positive. The timing diagrams of FIG. 10*c* represent the case in which the deviation of the comparator is negative.

The apparatus of the present invention limits the dead zone of the servomechanism to a predetermined value, which is smaller than the amount of movement caused by a deviation of plus or minus 1 in the contents of the comparator. In other words, the first command pulse can effect movement in the servomechanism.

While a preferred embodiment of this invention has been described. It will be obvious to those skilled in the art that various changes and modifications may be made therein without departing from the invention and it is therefore intended in the appended claims to cover all such modifications which fall within the spirit and scope of this invention.

What is claimed as new and desired to be secured by Letters Patent of the United States is:

1. In a digital servomechanism for controlling the movements in opposite directions of an output element in response to command pulses and to pulses in a feedback loop, said servomechanism comprising a pair of counters each capable of containing a count of $n$ and which operate in synchronism at the same frequency, movement of said output element resulting from a difference in the contents of one of said counters with respect to the contents of the other of said counters in response to the application of said pulses to said servomechanism, apparatus for minimizing dead zones in said servomechanism, comprising a coincidence circuit connected to selected outputs of said counters and operated in response to the application thereto of the outputs of said counters; first and second gate circuits each having an output connected as an input of the other; means for applying the output of said coincidence circuit as inputs to both said gate circuits; a flip-flop having a set input, a reset input and an output; a first two-position signal switch interposed between one of said counters and the set input of said flip-flop for normally connecting the $n$th count output of said one of said counters to said set input when said first switch is in one of its selected positions; a second two-position signal switch interposed between the other of the counters and the reset input of said flip-flop for normally connecting the $n/2$th count output of said other of said counters to said reset input when said second switch is in one of its selected positions; means including said gate circuits for applying the output of said coincidence circuit to both said switches to change said switches to the other of their selected positions, said first switch in the other of its selected positions connecting the $n-m$ count output of said one of said counters as a set input to said flip-flop and said second switch in the other of its selected positions connecting the $$\frac{n}{2}-m$$

count output of said other of said counters as a reset input to said flip-flop, said flip-flop producing at its output an output square wave in which the duration of the complementary portions of a cycle of said square wave vary in accordance with the outputs of said counters, said $m$ quantity causing a variation in said duration commensurate with said quantity and being selected to represent a specific duration increment.
switch in the other of its selected positions connecting the

2. A servomechanism as claimed in claim 1 wherein said one counter is a function counter and said other counter is a reference counter.

3. A servomechanism as claimed in claim 2, further comprising a clock pulse generator for producing first and second output pulse trains displaced from each other in phase, said first pulse train being applied as an input to both of said counters.

4. A servomechanism as claimed in claim 3, are further comprising an input stage for applying said pulses for effecting movement in one direction and for applying said first pulse train to said function counter, and a subtraction stage for applying pulses for effecting movement in the opposite direction and for applying said first pulse train to said function counter, said opposite direction pulses being in phase with said second pulse train.

5. A servomechanism as claimed in claim 1, wherein said switches are bistable signal operated switches.

6. A servomechanism as claimed in claim 1, wherein each of said counters, said coincidence circuit, each of said gate circuits, said flip-flop circuit and said signal switches comprises a ferrotransistor circuit.

7. A servomechanism as claimed in claim 4, wherein said subtraction stage comprises a ferrotransistor circuit.

References Cited

UNITED STATES PATENTS

| | | | |
|---|---|---|---|
| 3,175,138 | 3/1965 | Kilroy et al. ------ | 318—30 XR |
| 3,353,161 | 11/1967 | Toscano ---------- | 318—28 XR |

BENJAMIN DOBECK, *Primary Examiner.*

U.S. Cl. X.R.

318—28